United States Patent
Valli

(10) Patent No.: US 11,095,856 B2
(45) Date of Patent: *Aug. 17, 2021

(54) SYSTEM AND METHOD FOR 3D TELEPRESENCE

(71) Applicant: PCMS Holdings, Inc., Wilmington, DE (US)

(72) Inventor: Seppo T. Valli, Espoo (FI)

(73) Assignee: PCMS Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/904,387

(22) Filed: Jun. 17, 2020

(65) Prior Publication Data

US 2020/0322575 A1    Oct. 8, 2020

Related U.S. Application Data

(63) Continuation of application No. 16/233,828, filed on Dec. 27, 2018, now Pat. No. 10,701,320, which is a continuation of application No. 15/525,518, filed as application No. PCT/US2015/059576 on Nov. 6, 2015, now Pat. No. 10,205,910.

(60) Provisional application No. 62/079,880, filed on Nov. 14, 2014.

(51) Int. Cl.
*H04N 7/15* (2006.01)
*G03B 21/00* (2006.01)
*G06T 15/00* (2011.01)

(52) U.S. Cl.
CPC ............. *H04N 7/157* (2013.01); *G03B 21/00* (2013.01); *G06T 15/005* (2013.01); *G06T 2215/16* (2013.01)

(58) Field of Classification Search
CPC combination set(s) only.
See application file for complete search history.

(56) References Cited

U.S. PATENT DOCUMENTS

| 7,865,834 B1 | 1/2011 | Van Os |
| 8,587,583 B2 | 11/2013 | Newcombe |
| 8,717,417 B2 | 5/2014 | Sali |

(Continued)

FOREIGN PATENT DOCUMENTS

WO    2012059279 A1    5/2012

OTHER PUBLICATIONS

Notification of Transmittal of the International Preliminary Report on Patentability for PCT/US2015/059576 dated Feb. 21, 2017, 16 pages.

(Continued)

*Primary Examiner* — Phung-Hoang J Nguyen
(74) *Attorney, Agent, or Firm* — Invention Mine LLC

(57) ABSTRACT

Systems and methods are described that enable a 3D telepresence. In an exemplary method, a 3D image stream is generated of a first participant in a virtual meeting. A virtual meeting room is generated. The virtual meeting room includes a virtual window, and the 3D image stream is reconstructed in the virtual window. The first participant thus appears as a 3D presence within the virtual window. The virtual meeting room may also include virtual windows providing 3D views of other participants in the virtual meeting and may further include avatars of other meeting participants and/or of the first meeting participant.

20 Claims, 13 Drawing Sheets

(56) References Cited

U.S. PATENT DOCUMENTS

| | | | |
|---|---|---|---|
| 10,719,192 B1* | 7/2020 | Cabanero | H04N 21/23412 |
| 2005/0286101 A1* | 12/2005 | Garner | G03H 1/2205 |
| | | | 359/9 |
| 2008/0158340 A1 | 7/2008 | Shibata | |
| 2009/0165000 A1 | 6/2009 | Gyorfi | |
| 2009/0244257 A1 | 10/2009 | MacDonald | |
| 2010/0159430 A1 | 6/2010 | Lee | |
| 2010/0257464 A1 | 10/2010 | Renner | |
| 2011/0025819 A1 | 2/2011 | Gorzynski | |
| 2012/0050458 A1 | 3/2012 | Mauchly | |
| 2013/0265382 A1 | 10/2013 | Guleryuz | |
| 2016/0065864 A1 | 3/2016 | Guissin | |

OTHER PUBLICATIONS

Written Opinion of the International Preliminary Examining Authority for PCT/US2015/059576 dated Oct. 11, 2016, 8 pages.
Claudia Kuster, Tiberiu Popa, Jean-Charles Bazin, Craig Gotsman, Markus Gross (2012), "Gaze Correction for Home Video Conferencing", ACM Transactions on Graphics, vol. 31, No. 6, Article 174, Nov. 2012, 6 p.
D. Roberts, R. Wolff, J. Rae, A. Steed, R. Aspin, M. McIntyre, A. Pena, O. Oyekoya, and W. Steptoe (2009), "Communicating Eye-gaze Across a Distance: Comparing an Eye-gaze enabled Immersive Collaborative Virtual Environment, Aligned Video Conferencing, and Being Together", in IEEE Virtual Reality 2009, pp. 135-142, Lafayette, USA, 2009.
Henry Fuchs and Andrei State (2014), "Immersive 3D Telepresence", Computer, vol. 47, No. 7, IEEE Computer Society, 2014, 7 p.
Cha Zhang, Qin Cai, Philip A. Chou, Zhengyou Zhang, Ricardo Martin-Brualla (2013), "Viewport: A Distributed, Immersive Teleconferencing System with Infrared Dot Pattern," IEEE Multimedia, vol. 20, No. 1, pp. 17-27, Jan.-Mar. 2013, pp. 17-27.
Kuster, C., et. al., "Towards next generation 3D Teleconference Systems". In 3DTV-Conference: The True Vision-Capture, Transmission and Display of 3D Video (3DTV-CON), (2012), IEEE, 4 pages.
Loop, C., et. al., "Real-Time High Resolution Sparse Voxelization with Application to Image-Based Modeling". In Proceedings of the 5th High-Performance Graphics Conference, ACM, Jul. 2013, 7 pages.
Maimone, Andrew, et. al., "Real-Time Volumetric 3D Capture of Room-Sized Scenes for Telepresence", 3DTV Conference: The True Vision—Capture, Transmission and Display of 3D Video, 3DTV-CON 2012, Zurich, Switzerland, Oct. 15-17, 2012.
Notification of Transmittal of the International Search Report and the Written Opinion of the International Searching Authority, or the Declaration for PCT/US2015/059576 dated Feb. 4, 2016, 12 pages.
Peter Kauff et al: "An Immersive 3D Video-Conferencing System using Shared Virtual Team User Environments", Proceedings of the 4th. Intl Conference on Collaborative Virtual Environments. CVE 2002. Bonn, Germany, Sep. 30-Oct. 2, 2002; ACM, US, No. 4th, Sep. 30, 2002 (Sep. 30, 2002), p. 105-112, XP002633305, ISBN: 978-1-58113-489-6.
Hideyuki Nakanishi et al: "Freewalk: A meeting environment for casual communication in a net-worked community", IEEE Multimedia, vol. 6, No. 2, Apr. 1, 1999 (Apr. 1, 1999), pp. 20-28, XP055243760, DOI: 10.1109/93.771370 the whole document.
Peter Quax et al: "A multi-user framework supporting video-based avatars" Proceedings of 2nd Workshop on Network and System Support for Games, Netgames '03, Jan. 1, 2003 (Jan. 1, 2003), pp. 137-147, XP055243989, New York, New York, USA DOI: 10.1145/963900.963913 ISBN: 978-1-58113-734-7 the whole document.
"Real Video conference system implemented in a virtual world. (Second Life)", Ip.com Journal, Ip.com Inc., West Henrietta, NY, US, Nov. 12, 2009 (Nov. 12, 2009), XP013135315, ISSN: 1533-0001 the whole document.

* cited by examiner

SYSTEM AND METHOD FOR 3D TELEPRESENCE

CROSS-REFERENCE TO RELATED APPLICATION

The present application is a continuation of U.S. patent application Ser. No. 16/233,828, entitled "SYSTEM AND METHOD FOR 3D TELEPRESENCE" and filed Dec. 27, 2018, which is a continuation of U.S. patent application Ser. No. 15/525,518, entitled "SYSTEM AND METHOD FOR 3D TELEPRESENCE" and filed May 9, 2017, now U.S. Pat. No. 10,205,910, issued Feb. 12, 2019, which is a national stage application under 35 U.S.C. § 371 of International Application No. PCT/US2015/059576, entitled "SYSTEM AND METHOD FOR 3D TELEPRESENCE" and filed Nov. 6, 2015, which claims benefit under 35 U.S.C. § 119(e) from U.S. Provisional Patent Application Ser. No. 62/079,880, entitled "SYSTEM AND METHOD FOR 3D TELEPRESENCE" and filed Nov. 14, 2014, all of which are hereby incorporated by reference in their entirety.

FIELD

This present disclosure relates to networked collaboration and telepresence using virtual 3D representations and natural 3D-sensor-captured representations.

BACKGROUND 3D technologies have been used in virtual environments and games. These technologies provide interaction in a virtual world between different users represented by a priori modeled avatars. However, the avatars lack realistic looks and behaviors of human users. Efforts have been made to extract 3D images of human users from their real-world background and to insert those users into a virtual environment (in place of an avatar), but such efforts suffer from image artifacts and edge effects that negate any purported gain in realism. Objects or items attached to the user, such as a head-mounted display (HMD) or the chair that the user is sitting on, are difficult to segment away in the real-time capture. Forming a more realistic parameterized 3D human may use extensive computing resources, e.g. sophisticated and high-speed inverse kinematics to derive the skeleton and the physical model of the real-time captured human object.

SUMMARY

This disclosure describes a mixed-reality telepresence system that combines real-time reconstructed meeting spaces into a combined synthetic 3D scene. The present disclosure provides systems and methods for providing a telepresence system that includes a display of a real-time three-dimensional (3D) reconstruction. The telepresence system permits video-like naturalness and enables remote sites to see a realistic 3D representation according to and actual viewpoint and movements in a virtual world.

In an exemplary embodiment, 3D data (such as an RGB-D representation) of a user is captured at a remote meeting site using a Kinect sensor or other 3D-image-capture technology, and the 3D data is displayed in a window or 3D screen in a collaborative virtual environment. A virtual meeting site in a collaborative virtual environment may thus include a window to each remote meeting site, thus providing realistic views and natural depth cues when other participants in the meeting (who may be represented by an avatar in the virtual environment) change their viewpoint (the avatar's position) in the virtual meeting space. Using each captured 3D scene/remote site without extracting or segmenting the human participants, is a way to avoid the segmentation errors that can otherwise result from efforts at image extraction.

In embodiments disclosed herein, the 3D captured participants do not need to be converted to avatars, which could involve higher fidelity and more complete (omnidirectional) rendering of the human form. For the same reason, neither are methods to track and copy each user's motions to his/her avatar (motion tracking, inverse kinematics, etc.) needed. While participants displayed through a window in a virtual meeting room do not necessarily have the full virtual mobility of an avatar representation, benefits in quality and speed can be obtained.

One embodiment takes the form of a method that includes receiving a 3D-data stream depicting a first participant; rendering a virtual meeting space having a virtual window for display of the first participant; rendering a first perspective projection stream of the received 3D-data stream from a first virtual viewpoint; displaying the rendered first perspective projection stream in the virtual window for the first virtual viewpoint; rendering a second perspective projection stream of the received 3D-data stream from a second virtual viewpoint; and displaying the rendered second perspective projection stream in the virtual window for the second virtual viewpoint.

DETAILED DESCRIPTION

Figure 1:
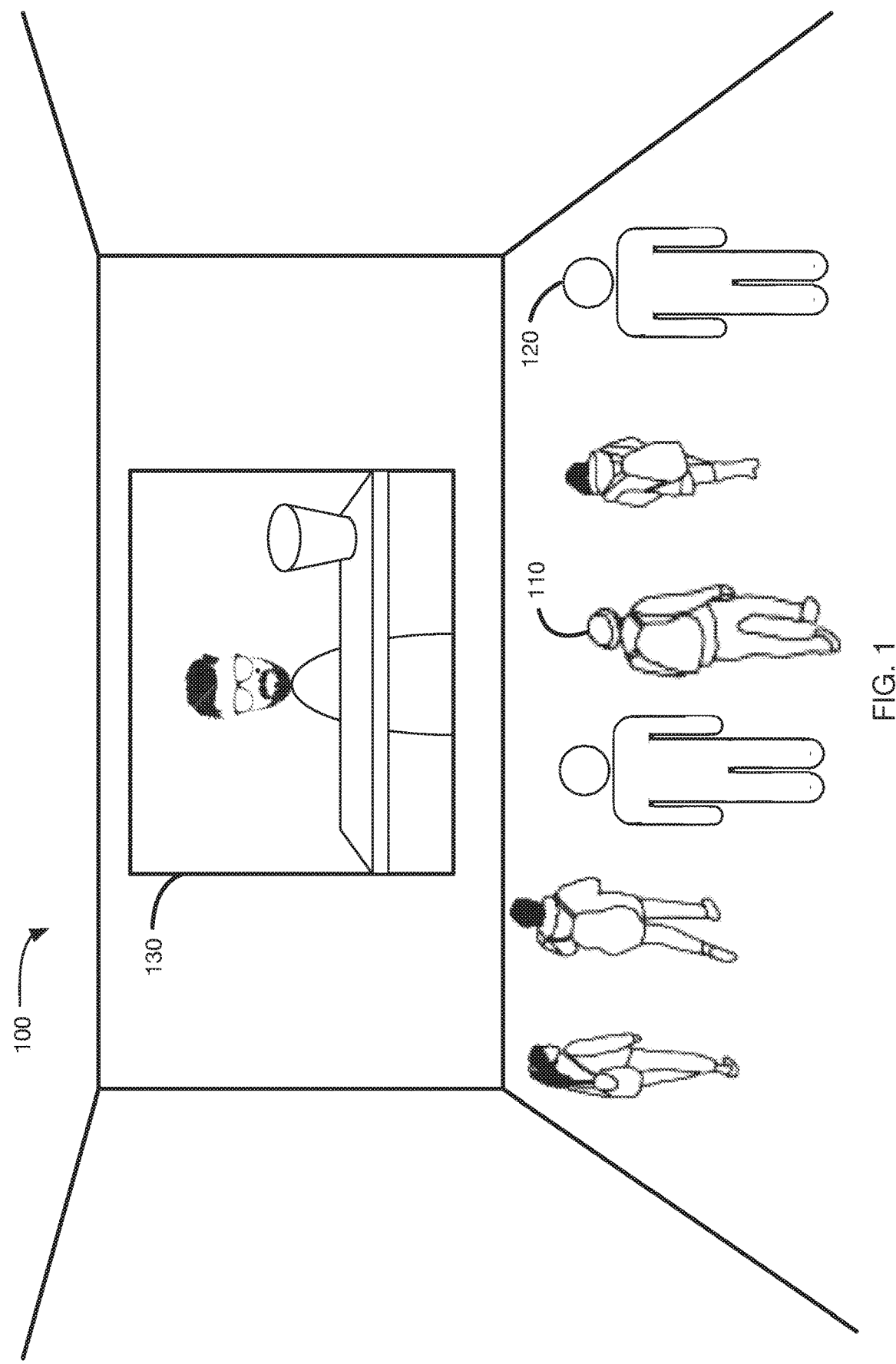
FIG. 1 is a display of a 3D representation of avatars in a virtual world in accordance with some embodiments.

Solutions supporting networked collaboration and telepresence are becoming more and more important in supporting environmentally friendly and efficient ways of work and life. This disclosure describes a telepresence system that combines benefits of conventional video-based telepresence with benefits of more modern 3D technologies. The techniques disclosed herein provide a balance between naturalness of video representations and the complexity of 3D-reconstruction-based systems.

Embodiments that are described herein are designed such that user's interaction with a conferencing system permits real-time reconstruction of 3D views. Some disclosed embodiments include a common virtual space, such as a lobby or entrance hall, and one or more reconstructions of 3D views of remote meeting locations in the physical world. The 3D reconstructions appear in the virtual world as if they were seen through windows into the physical world.

A collaborative virtual environment used in various embodiments can be implemented using one or more collaboration technologies. For example, OpenQwaq (formerly known as Teleplace) is open-source computer software for immersive collaboration. Second Life is another platform for social collaboration in a virtual world. ActiveWorlds and Kaneva are other examples of collaborative virtual environments that can be employed or adapted for use in embodiments disclosed herein.

Various telepresence systems known in the art employing real-time 3D capture and reconstruction can be used with embodiments disclosed herein. For example, Andrew Maimone and Henry Fuchs from the University of North Carolina at Chapel Hill have introduced telepresence systems offering dynamic real-time 3D scene capture for 3D displays (see "Real-Time Volumetric 3D Capture of Room-Sized Scenes for Telepresence", 3DTV Conference: The True Vision-Capture, Transmission and Display of 3D Video, 3DTV-CON 2012, Zurich, Switzerland, Oct. 15-17, 2012). Another example is the ViewPort system by Zhang et al., where high-quality 3D models are formed for each user in real time, and extracted and embedded into a common virtual environment. The system supports eye contact between multiple sites with one user at each site (see "Viewport: A Distributed, Immersive Teleconferencing System with Infrared Dot Pattern," IEEE Multimedia, vol. 20, no. 1, pp. 17-27, January-March 2013, pp. 17-27).

One 3D capture and reconstruction technology that can be used with embodiments disclosed herein has been developed at the BeingThere Centre of the University of North Carolina at Chapel Hill (UNC). The system provides immersive 3D telepresence systems using 3D capture of room-sized scenes. Similarly, 3D image capture and reconstruction can be conducted with the use of one or more Kinect cameras. An informative article on the possibilities and challenges of 3D capture based telepresence systems is given by Henry Fuchs (see "Immersive 3D Telepresence", Computer, vol. 47, no. 7, IEEE Computer Society, 2014, 7 p).

FIG. 1 shows an exemplary implementation of a common virtual space, such as a lobby or entrance hall, to which one or more 3D reconstructed physical spaces can be added. The exemplary view 100 includes a floor, walls, and a number of avatars, as well as a virtual window 130.

In some embodiments, additional details of the exemplary view 100 may raise the level of naturalness of the virtual world. One method to raise the level of naturalness of the virtual world may be to copy or construct a high fidelity version of the real world in advance.

The 3D representation of a user can be depicted using an avatar. FIG. 1 shows a 3D representation of the users as avatars. FIG. 1 depicts two types of avatars. Some exemplary avatars are generic figures with simple shapes, such as avatar 120 in FIG. 1. Additional exemplary avatars are more detailed avatars that raise the level of naturalness by depicting detailed components of the avatar, such as facial features, arms, legs, fingers, clothing and accessories, as represented by avatar 110. The view 100 similarly depicts more detailed exemplary avatars. In various embodiments, both the virtual world and the avatars' appearance and movements/animations can be produced in advance by copying, modeling, or other means.

In the exemplary view 100, the users share a common meeting environment and have mobility to move in the 3D space. The users also have the ability to change the appearance of the avatar.

FIG. 1 shows an exemplary embodiment. In particular, FIG. 1 shows an exemplary view of a compiled 3D collaborative virtual environment that includes a virtual world, other user's avatars, and a virtual window (or video conference screen) 130. The users are able to see and interact with the video conference screen. In some embodiments, the video conference screen is a two-dimensional (2D) video or a portal to another 3D view. In a compiled 3D view, the perspective changes to show natural depth cues, parallax, perspective and other depth cues when a virtual viewpoint is changed. The user's view-point and movements in the virtual world give the user a more immersive experience.

Figure 2A:
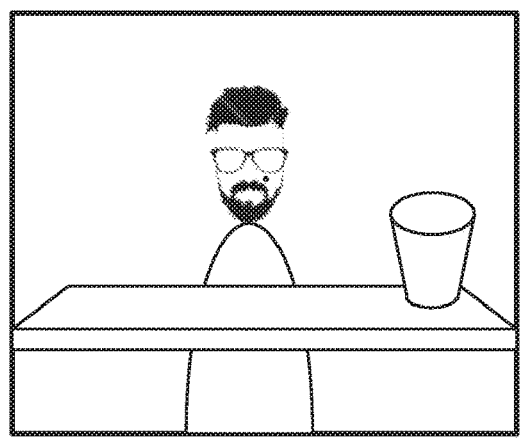
FIGS. 2A-2C are example perspectives of a 2D image in a virtual window.
Figure 2B:
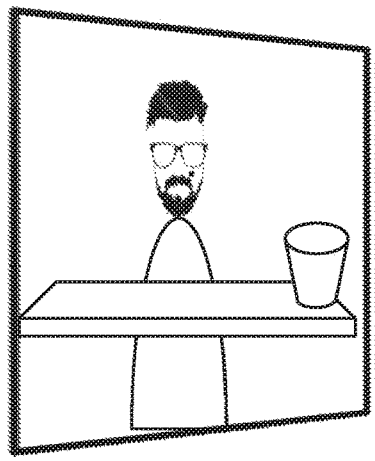
Figure 2C:
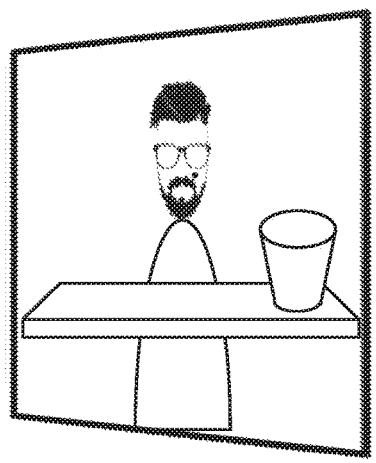

FIGS. 2A-2C show example perspectives that do not utilize 3D reconstruction. FIG. 2A depicts a head-on view of a 2D screen. As a user changes virtual viewpoints, the 2D screen becomes distorted, as shown in FIGS. 2B and 2C as the user moves left and right, respectively. It is noted that, regardless of viewpoint, the viewer of this 2D screen always sees the same part of the depicted user's face. However, with 3D reconstruction, the user's perspective from various virtual viewpoints may change and give the user a sense of depth and perspective while looking into the virtual window.

Figure 3A:
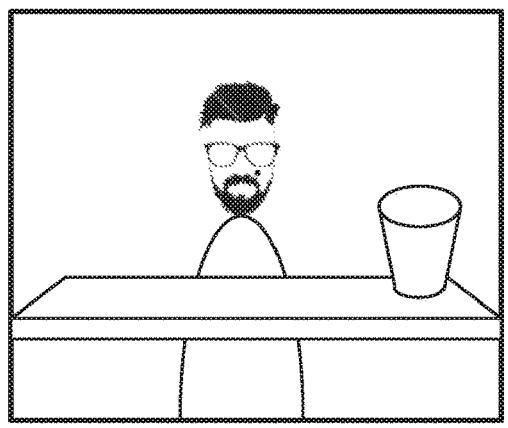
FIGS. 3A-3C are example perspectives of a 3D reconstructed image in a virtual window.
Figure 3B:
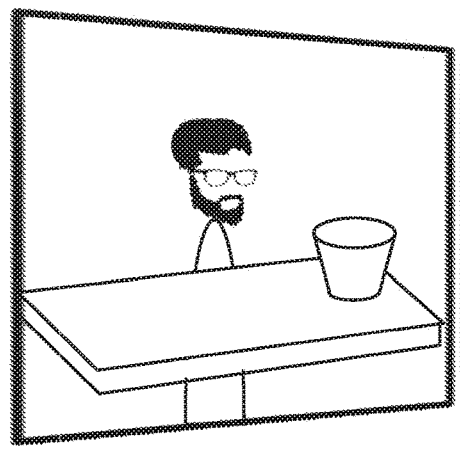
Figure 3C:

FIGS. 3A-3C show an exemplary embodiment of a reconstructed 3D view. In the views of FIGS. 3A-3C, a live human user may be depicted within a real background. FIGS. 3A-3C depict a user standing behind a desk with an object on the desk. In some embodiments the desk with the object on it may be part of the user's actual environment captured by a 3D video. In some embodiments the desk with the object may be part of a virtually rendered environment, in the case that the user is a reconstructed avatar. FIG. 3A depicts a head-on view, while FIGS. 3B and 3C depict perspectives from the left and right, respectively. In some embodiments, the reconstructed 3D view is similar to the view shown in FIG. 3A. The view is a high-quality 3D model or 3D-data stream created for each user in real-time. In some embodiments, the view is created with one or more depth sensing cameras. Alternatively, the view may be generated with two or more cameras in combination with a processor programmed to calculate depth from parallax information.

The perspective shown in FIG. 3B is the reconstructed 3D view seen by a participant from a first virtual viewpoint. The perspective shown in FIG. 3C is the reconstructed 3D view seen by a participant from a second virtual viewpoint, where the second virtual viewpoint is to the right of the first virtual viewpoint from the viewer's perspective. It is noted that the perspective views in FIGS. 3A, 3B, and 3C show three different sides of the depicted users face, and that the desk and the object are shown from different sides in the respective figures as well.

The reconstructed views allow perspective changes to show natural depth cues, parallax, perspective and other depth cues when a virtual viewpoint is changed. In some embodiments, the reconstructed views shown in FIGS. 3A-3C may be live video feeds of the user within the user's background. In other embodiments, the reconstructed views may be rendered avatars within a virtual environment. In embodiments where the user is using virtual reality accessories (such as head mounted displays, or HMDs), the reconstructed view may segment out the virtual reality accessories, and insert representations of the user's face, hands, or any other part of the user obstructed by virtual reality accessories. Such embodiments allow more natural interaction between participants, a main example being more natural eye-contact.

A 3D view such as those illustrated in FIGS. 3A-3C may be displayed as a 2D projection on a conventional 2D monitor. In other embodiments, a 3D view such as those of FIGS. 3A-3C may be displayed using a 3D display device, such as a 3D virtual reality or augmented reality headset, an auto-stereoscopic 3D display, or a holographic display. In embodiments using 3D displays, the display can be processed to give the appearance of eye contact for one or more users at each of multiple sites.

In some embodiments, forming a 3D representation of the user may use high speed inverse kinematics to derive the user's skeleton and the physical model of the real-time captured user. In some embodiments, image artifacts may occur around the periphery of the user that result from the attempt to place the user in a virtual environment. In embodiments which display the user in his actual environment, artifacts of much lesser magnitude are generated with the 3D reconstruction of the user in his own live environment.

Figure 4:
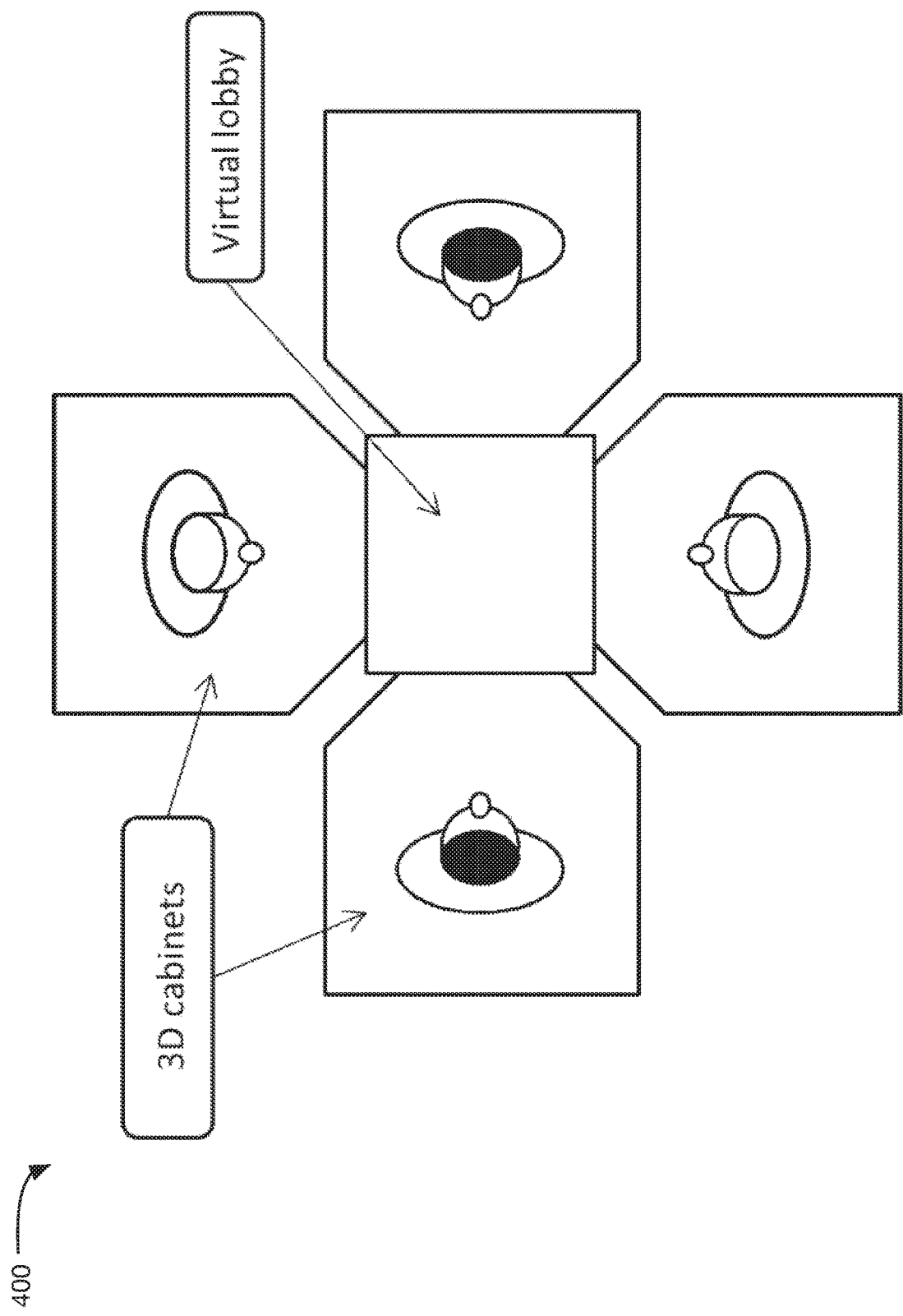
FIG. 4 is a schematic plan view of a virtual meeting room in accordance with some embodiments.

FIG. 4 depicts a layout of a virtual meeting room 400 in an exemplary embodiment. The virtual meeting room 400 includes a virtual lobby and four separate reconstructed 3D cabinets, or views. The exemplary virtual meeting room 400 is shown with four separate reconstructed 3D views by way of example, and not as a limitation, as any number of 3D reconstructed views can be included. The virtual meeting room 400 is depicted as an overhead representation. The relative location of the views depicts the location of each 3D reconstructed view relative to each other. This is similar to people sitting around a physical table. In some embodiments, users pick the location or their 3D reconstruction relative to other 3D reconstructions and the virtual lobby.

Figure 5:
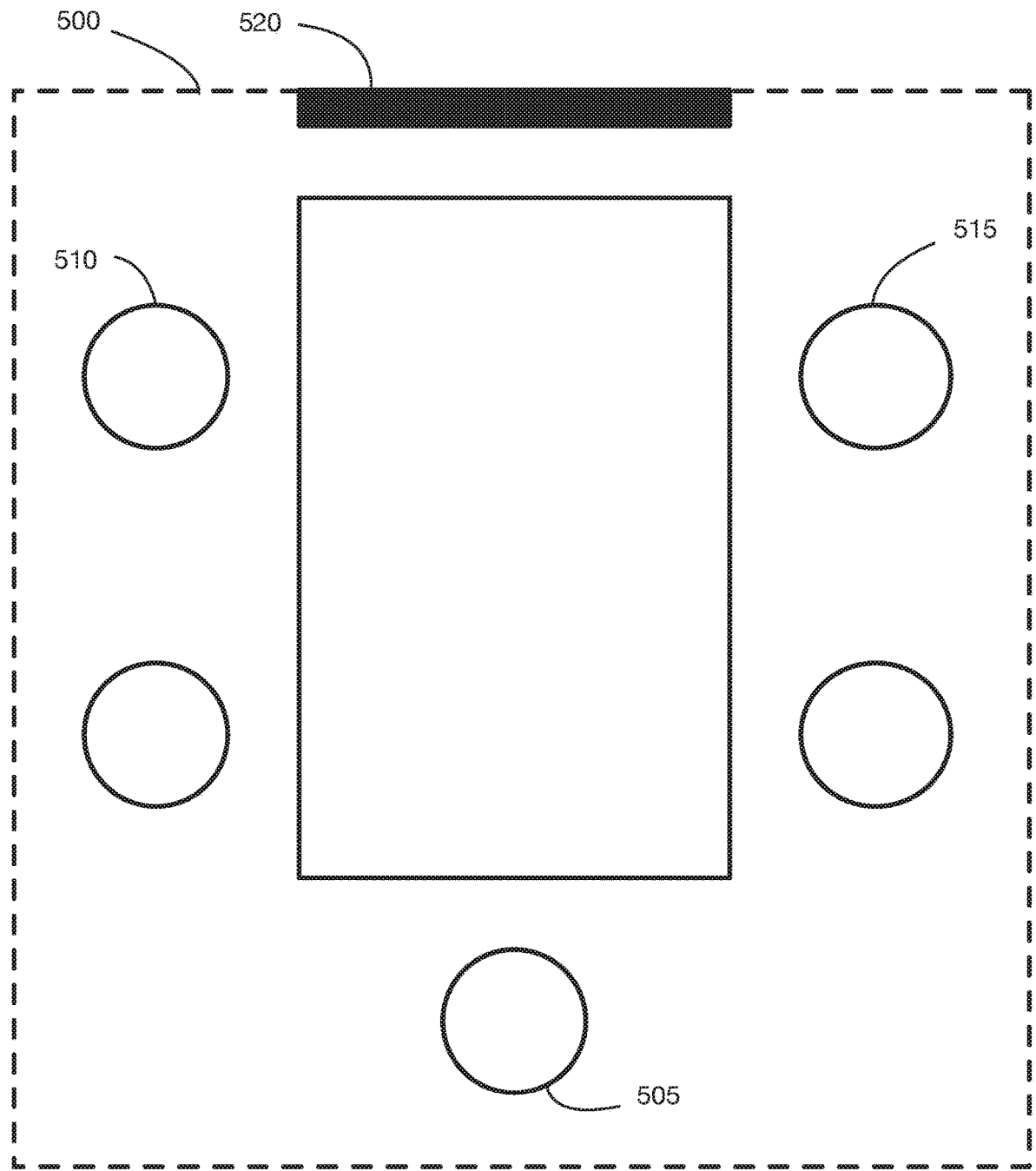
FIG. 5 is a top-down view of a virtual meeting space, in accordance with some embodiments.

FIG. 5 depicts a top-down view of a virtual meeting space 500. As shown, virtual meeting space 500 includes avatars 505, 510 and 515, as well as virtual window 520. A meeting table is shown in the center of the virtual meeting space, however any virtual objects may be rendered within the virtual meeting space such as virtual chairs, plants, paintings, wallpaper, windows, and any other virtual objects known to one of skill in the art. As shown, FIG. 5 includes 5 avatars and one 3D reconstruction (that would be displayed within virtual window 520), however any number of avatars and 3D reconstructions may be used.

Figure 6:
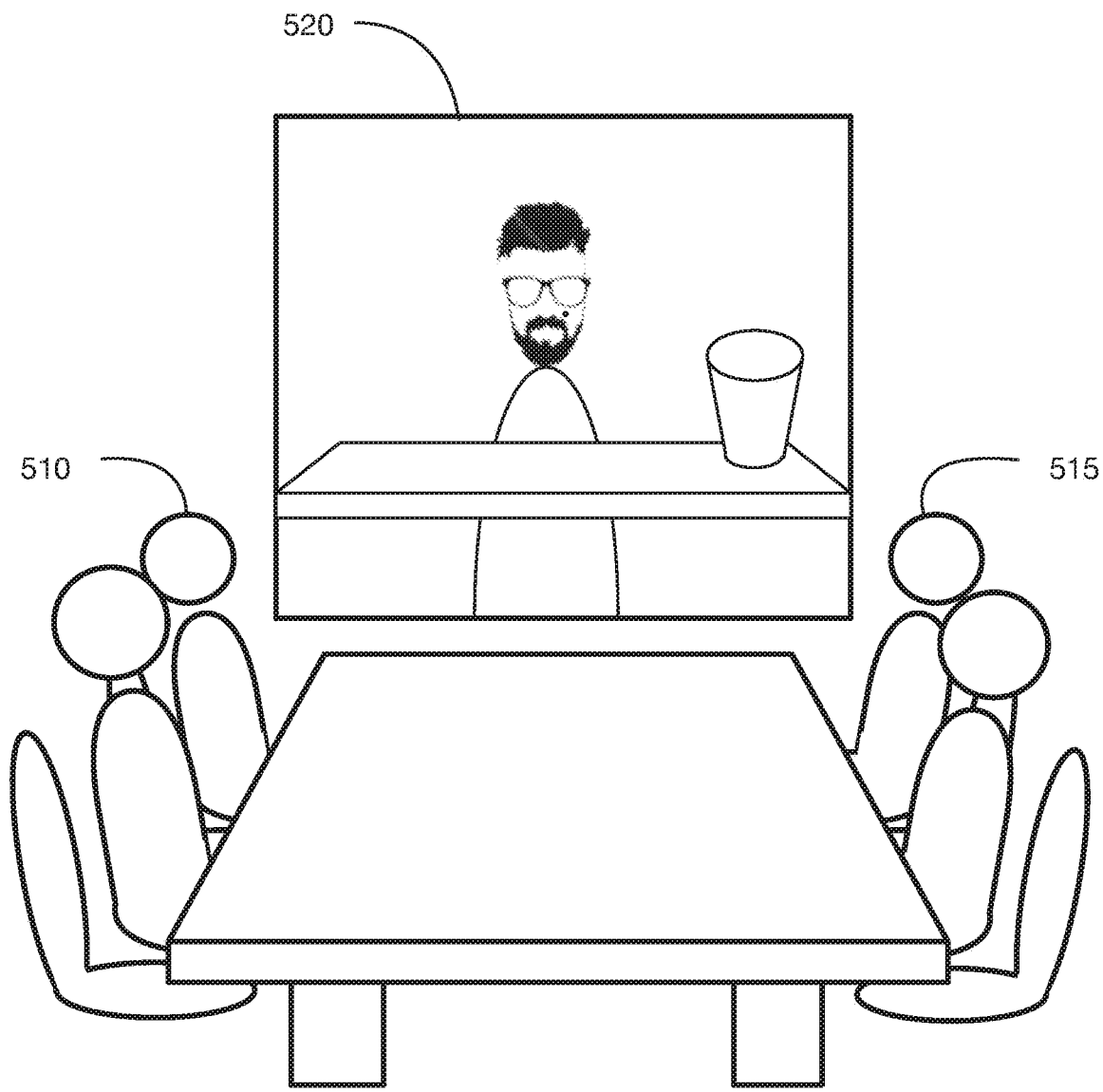
FIG. 6 is a perspective of a virtual meeting space from the point of view of an avatar, in accordance with some embodiments.

FIG. 6 depicts a first perspective projection stream of a received 3D data stream of the virtual meeting space 500 from a viewpoint occupied by avatar 505. The view in FIG. 6 is a first perspective projection stream from a first virtual viewpoint occupied by avatar 505. A 3D reconstructed room appears through a window or 3D video screen 520 in the virtual meeting space 500. A 3D view such as the view of FIG. 6 can be displayed on, for example, a two-dimensional computer monitor of a participant in the virtual meeting (in this example the participant represented by avatar 505).

The example system in FIG. 6 depicts a view from a shared virtual space and one remote 3D view. The example system in FIG. 6 is similar to the example system 400 explained above. FIG. 6 depicts a single remote site as a reconstructed 3D view, and multiple avatars seated at a meeting table in the virtual lobby. The avatars are free to be represented as sitting at the table, but are also able to move about the virtual lobby and into the reconstructed 3D view. In various embodiments, a user can choose to be displayed as an avatar, as a real-time reconstruction in their actual environment, or as a real-time reconstruction in a virtual environment. In some embodiments, the 3D view takes the form of any of the 3D reconstructions disclosed herein.

Figure 7:
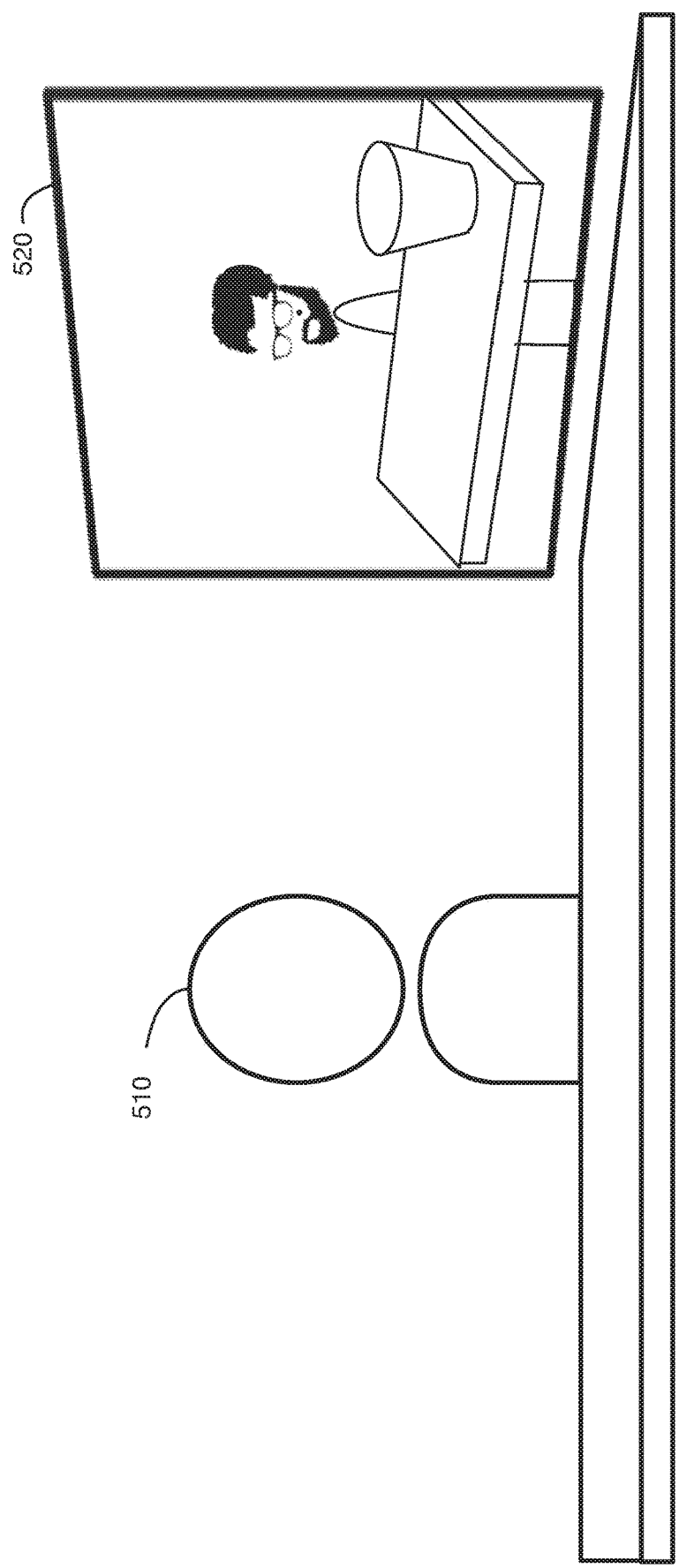
FIG. 7 is a perspective of a virtual meeting space from the point of view of an avatar, in accordance with some embodiments.

FIG. 7 depicts a second perspective projection stream of the received 3D data stream from a second virtual viewpoint occupied by avatar 515. As shown, avatar 515 can still see avatar 510 to the left of virtual window 520. Furthermore, avatar 515 receives a different perspective projection stream different than that of avatar 505. Avatar 505 sees the front of the participant's face while avatar 515 sees the right side of the participant's face. In some embodiments, in addition to a first participant depicted by the 3D reconstructed view within virtual window 520, there may be a second participant in the virtual meeting. The second participant may be able to select various virtual viewpoints occupied by the five avatars in FIG. 5. In some embodiments, the virtual viewpoints may be predetermined locations within the virtual meeting space. In other embodiments, the second participant may be able to "walk" his/her avatar around the virtual meeting space for any arbitrary virtual viewpoint, or move around his/her remote site freely (also changing the virtual viewpoint).

Figure 8:
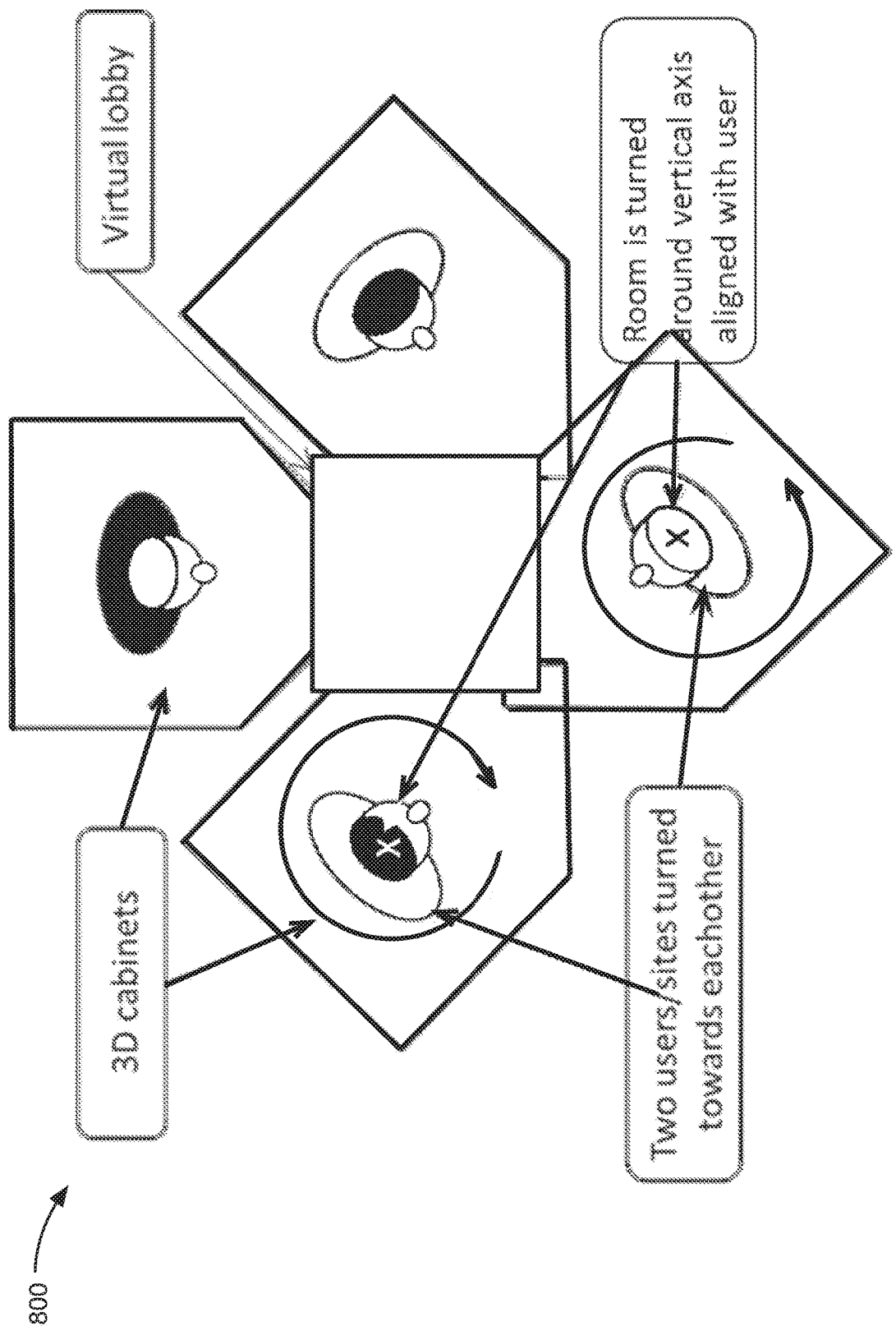
FIG. 8 is a schematic plan view of a virtual meeting room, in accordance with some embodiments.

FIG. 8 is a plan view of virtual meeting room in some embodiments. The virtual meeting room 800 includes a virtual lobby, and multiple 3D views, or cabinets, and is similar to the meeting room 400. As illustrated in FIG. 8, in some embodiments, the virtual cabinets can be rotated to afford users a more direct view through a virtual window into the virtual cabinet. This rotation can be performed around a vertical axis at or near the eyes of the user who appears to be within the cabinet.

In some embodiments, the virtual viewpoint can be chosen by the users. Additionally, the virtual viewpoint can correspond to user's eye positions. The virtual viewpoint can be adjusted manually to give the appearance of eye-contact between two communicating participants, or positioning of virtual viewpoints can be assisted by a computer to provide the appearance of eye contact. When a user chooses to be represented by an avatar, the user can change his/her virtual viewpoint with interactions with a keyboard or mouse, or any other similar action.

In some embodiments, a 3D-data stream depicting a first participant is received. A virtual meeting space is rendered, the virtual meeting space having a virtual window for display of the first participant. A first perspective projection stream is rendered of the received 3D-data stream from a first virtual viewpoint, which is displayed in the virtual window for the first virtual viewpoint. A second perspective projection stream of the received 3D-data stream is rendered from a second virtual viewpoint, and displayed in the virtual window for the second virtual viewpoint. In some embodiments, the first perspective projection stream is displayed at a first time for a second participant, and the second perspective projection stream is displayed at a second time for the second participant, e.g. if the second participant starts by viewing the first perspective projection stream from the first virtual viewpoint, and an input from at least one of the first or second participant causes the second participant to receive the second perspective projection stream from the second virtual viewpoint. In other embodiments, the rendered first perspective projection stream is displayed for a second participant and the rendered second projection stream is displayed for a third participant, e.g. various perspective projection streams of the 3D-data stream may be simultaneously displayed for different participants at different virtual viewpoints. In other embodiments, the various perspective projection streams may be displayed at different times for different participants within the virtual meeting. For instance, the second participant may be viewing the first perspective projection stream at a first time during a meeting, and at a second time a third participant joins the meeting and receives the second perspective projection stream.

A user can select to appear as an avatar or a 3D reconstruction and transition between being represented as an avatar or a 3D reconstruction by interaction with a user interface. The user's 3D view can change appearance when the user transitions to be represented by an avatar from a 3D reconstruction. By way of example, the changes to the 3D view can include graying out, dimming, or fading of the 3D view. The 3D view may also vanish when the user is portrayed as an avatar. In some embodiments, the user changes virtual viewpoint to an avatar and this change is not visible to other users. The user's 3D view changes appearance when the user transitions to be represented by a 3D reconstruction from an avatar. The appearance changes may include fading out of the user's avatar and fading in of the 3D reconstruction and a transition to the geometry of the combined 3D meeting space which includes the user now represented as a 3D reconstruction.

In some embodiments, a transition between an avatar representation and a 3D reconstruction is accompanied by additional cues. The additional cues may include any of the following: an avatar moving away from the 3D reconstruction, an avatar moving into the 3D reconstruction, graphical and textual annotations, and audio cues.

In some embodiments, a user selects to be represented as a 3D reconstruction in either a virtual world or the actual site in which he is located. In these embodiments, the user changes virtual viewpoint by turning and/or moving with respect to the reconstructed 3D views.

The system 800 depicts two users altering their virtual viewpoints. The virtual viewpoint is altered by rotating the view about an axis approximately perpendicular to the floor and approximately parallel to an axis of a standing user, or the upright head of a sitting user. Each vertical axis is approximately perpendicular to the floor and approximately parallel to an axis of a user. A first user is rotated to the right about its vertical axis to face the second user. The second user is rotated to the left about its vertical axis to face the first user. Rotation about the spatial axis of the other dimensions may be locked for simplicity, or enabled simultaneously by a suitable 3D mouse type of interaction.

In some embodiments, the virtual viewpoint is changed by a local user, a remote user, or automatically during the compilation of 3D reconstructions (for example when including more users/sites to the telepresence session).

In some embodiments, the user can select the virtual viewpoint in the virtual world by rotating the reconstructed 3D view with respect to other reconstructed 3D views or by changing the perspective viewed from the user's avatar's eyes. This results in either a second person or a first person view, respectively.

In some embodiments, the 3D reconstruction is displayed as a 2D projection of the virtual space on a PC screen or a stereoscopic 3D display. A user may also wear 3D glasses or accessories to facilitate 3D sensations.

In some embodiments, the 3D reconstruction is scaled respective to each of the other 3D reconstructions. The 3D reconstruction is scaled with respect to the common lobby connecting them, in particular, the avatar, figures and common natural objects like tables and chairs. In some embodiments, the scaling of the 3D reconstruction is based on actual measurements of real physical dimensions of the 3D captured sites. Additionally, scaling may be a combination of automatic scaling and manual adjustments initiated by users.

In some embodiments, multiple users, not extracted from their physical scene, are compiled into a single virtual representation. In some embodiments, a user may be represented both as a 3D representation and as an avatar.

In some embodiments, remote meeting sites are depicted on 3D video screens in a virtual world. The virtual world representation includes a common virtual space connecting several reconstructed 3D views. The layout of the combined meeting space is flexible relating the position of the connected 3D views and can be altered by the system settings or the users.

Figure 9:
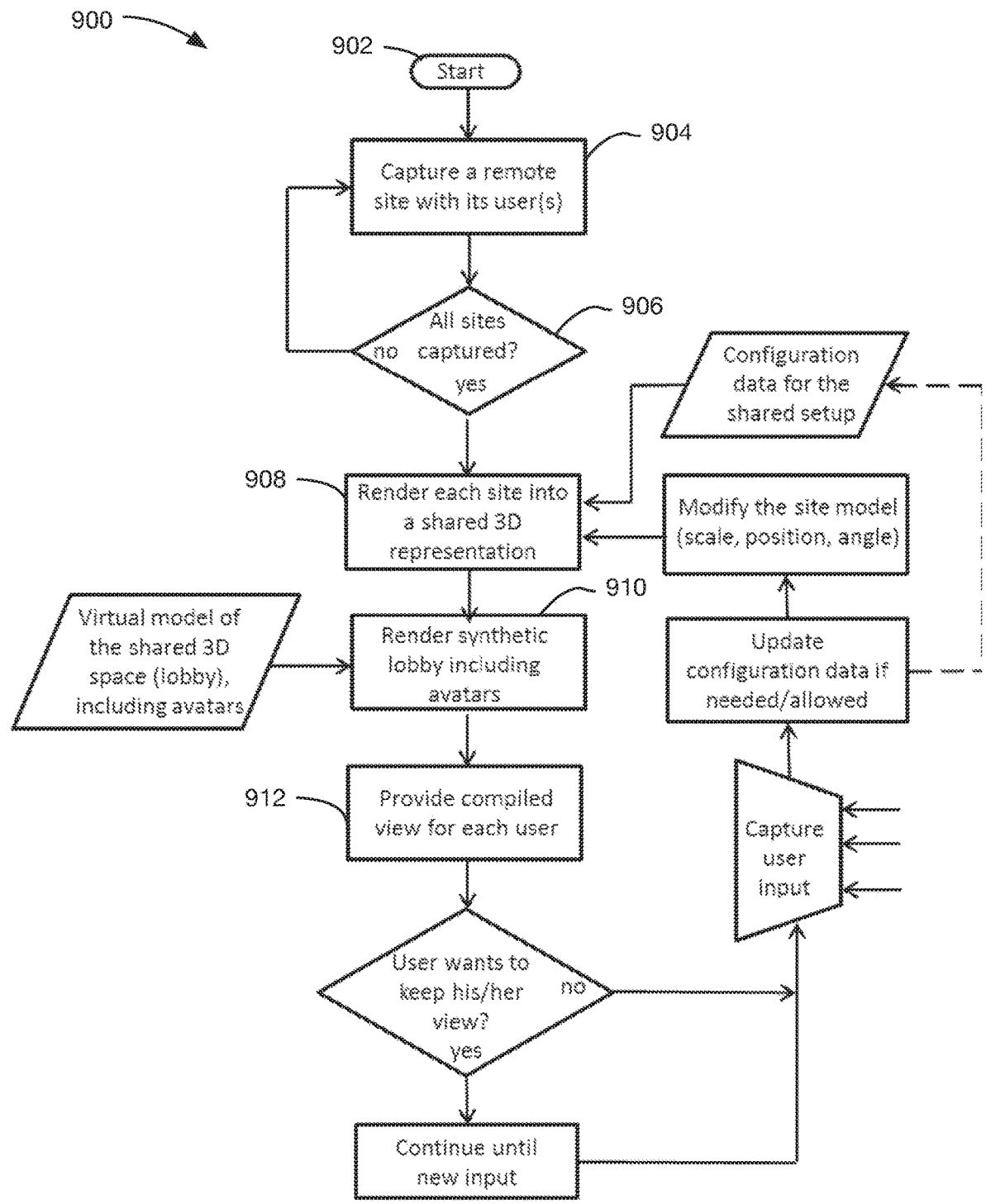
FIG. 9 is a flow diagram depicting a method used in some embodiments.

FIG. 9 depicts an exemplary method. In particular, FIG. 9 depicts an exemplary method 900. In the exemplary method 900, a user initiates or joins a conference session at step 902. At step 904, a 3D capture system captures a remote site and its users. The 3D capture system can be any 3D capture system known by those with skill in the relevant art. At the decision box 906, a check is performed to verify if all sites participating in the conference session have been captured. If not, the uncaptured sites are captured. When all sites are captured, each site is rendered and shared as a 3D representation at step 908.

Using inputs from each site's 3D rendering and of the virtual model of the shared 3D space, or lobby, a synthetic lobby including avatars is rendered at step 910. At step 912, compiled view is provided to each user. Additional user inputs are captured and the configuration is updated if needed. The site model is modified to correct for appropriate scale, position, and angle. Configuration data is also shared for setup.

Figure 10:
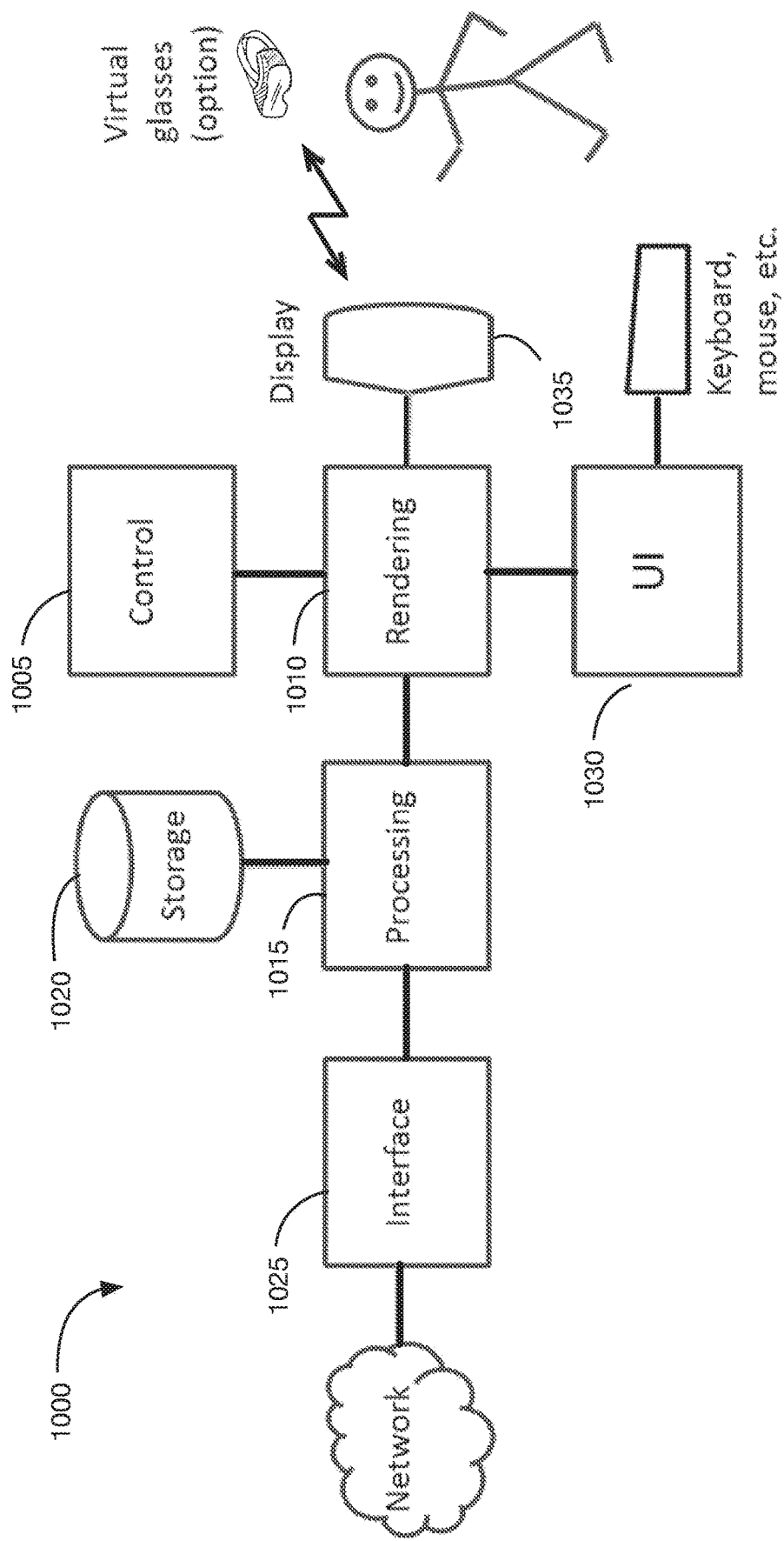
FIG. 10 is a schematic functional block diagram of an exemplary system, in accordance with an embodiment.

FIG. 10 depicts an exemplary system, in accordance with an embodiment. The exemplary system 1000 is representative of a system capable of performing the disclosed methods. The components of the exemplary system 1000 include a control system 1005, a rendering system 1010, a processing system 1015, data storage 1020, a communication interface 1025, a user interface 1030—such as a touchscreen, keyboard, or mouse, and a display 1035, such as virtual glasses, projectors, or 3D displays.

The processing system 1015 may include a processor. The processor may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor may perform signal coding, data processing, power control, input/output processing, and/or any other functionality that enables the components to operate in a wireless environment. The processor may be coupled to the communication interface, or a transceiver, which may be coupled to a transmit/receive element for communication with other networks. The various components, such as the processor and the transceiver, are depicted as separate components, but it will be appreciated that the processor and the transceiver may be integrated together in an electronic package or chip.

Various components of the system 1000 may have wireless transmit and receive capabilities and are able to be carried out by a wireless transmit/receive unit (WTRU). These components may include the display device, the user interface, or all of the system 1000. The WTRU functionality may be included in, for example, a virtual reality headset such as the Oculus Rift headset.

Figure 11:
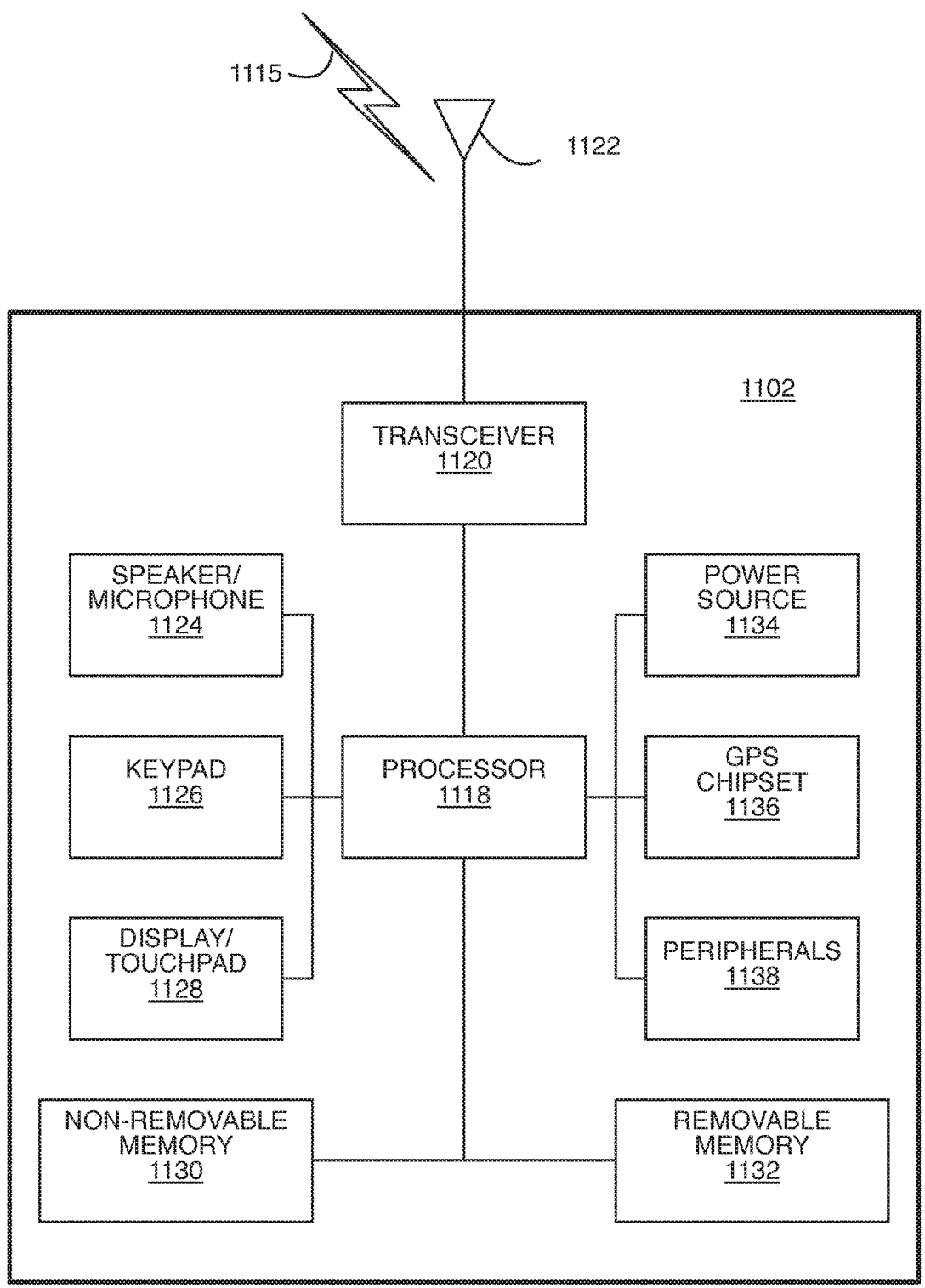
FIG. 11 is a functional block diagram of an exemplary wireless transmit receive unit, in accordance with an embodiment.

FIG. 11 depicts an exemplary WTRU. As shown in FIG. 11, the WTRU 1102 may include a processor 1118, a transceiver 1120, a transmit/receive element 1122, audio transducers 1124 (preferably including at least two microphones and at least two speakers, which may be earphones), a keypad 1126, a display/touchpad 1128, a non-removable memory 1130, a removable memory 1132, a power source 1134, a global positioning system (GPS) chipset 1136, and other peripherals 1138. It will be appreciated that the WTRU 1102 may include any sub-combination of the foregoing elements while remaining consistent with an embodiment. The WTRU may communicate with nodes such as, but not limited to, base transceiver station (BTS), a Node-B, a site controller, an access point (AP), a home node-B, an evolved home node-B (eNodeB), a home evolved node-B (HeNB), a home evolved node-B gateway, and proxy nodes, among others.

The transmit/receive element 1122 may be configured to transmit signals to, or receive signals from, a node over the air interface 1115. For example, in one embodiment, the transmit/receive element 1122 may be an antenna configured to transmit and/or receive RF signals. In another embodiment, the transmit/receive element 1122 may be an emitter/detector configured to transmit and/or receive IR, UV, or visible light signals, as examples. In yet another embodiment, the transmit/receive element 1122 may be configured to transmit and receive both RF and light signals. It will be appreciated that the transmit/receive element 1122 may be configured to transmit and/or receive any combination of wireless signals.

In addition, although the transmit/receive element 1122 is depicted in FIG. 11 as a single element, the WTRU 1102 may include any number of transmit/receive elements 1122. More specifically, the WTRU 1102 may employ MIMO technology. Thus, in one embodiment, the WTRU 1102 may include two or more transmit/receive elements 1122 (e.g., multiple antennas) for transmitting and receiving wireless signals over the air interface 1115.

The transceiver 1120 may be configured to modulate the signals that are to be transmitted by the transmit/receive element 1122 and to demodulate the signals that are received by the transmit/receive element 1122. As noted above, the WTRU 1102 may have multi-mode capabilities. Thus, the transceiver 1120 may include multiple transceivers for enabling the WTRU 1102 to communicate via multiple RATs, such as UTRA and IEEE 802.11, as examples.

The processor 1118 of the WTRU 1102 may be coupled to, and may receive user input data from, the audio transducers 1124, the keypad 1126, and/or the display/touchpad 1128 (e.g., a liquid crystal display (LCD) display unit or organic light-emitting diode (OLED) display unit). The processor 1118 may also output user data to the speaker/microphone 1124, the keypad 1126, and/or the display/touchpad 1128. In addition, the processor 1118 may access information from, and store data in, any type of suitable memory, such as the non-removable memory 1130 and/or the removable memory 1132. The non-removable memory 1130 may include random-access memory (RAM), read-only memory (ROM), a hard disk, or any other type of memory storage device. The removable memory 1132 may include a subscriber identity module (SIM) card, a memory stick, a secure digital (SD) memory card, and the like. In other embodiments, the processor 1118 may access information from, and store data in, memory that is not physically located on the WTRU 1102, such as on a server or a home computer (not shown).

The processor 1118 may receive power from the power source 1134, and may be configured to distribute and/or control the power to the other components in the WTRU 1102. The power source 1134 may be any suitable device for powering the WTRU 1102. As examples, the power source 1134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 1118 may also be coupled to the GPS chipset 1136, which may be configured to provide location information (e.g., longitude and latitude) regarding the current location of the WTRU 1102. In addition to, or in lieu of, the information from the GPS chipset 1136, the WTRU 1102 may receive location information over the air interface 1115 from a base station and/or determine its location based on the timing of the signals being received from two or more nearby base stations. It will be appreciated that the WTRU 1102 may acquire location information by way of any suitable location-determination method while remaining consistent with an embodiment.

The processor 1118 may further be coupled to other peripherals 1138, which may include one or more software and/or hardware modules that provide additional features, functionality and/or wired or wireless connectivity. For example, the peripherals 1138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

The processor 1118 may have the same capabilities of the processor of the system 1000, described above.

Figure 12:
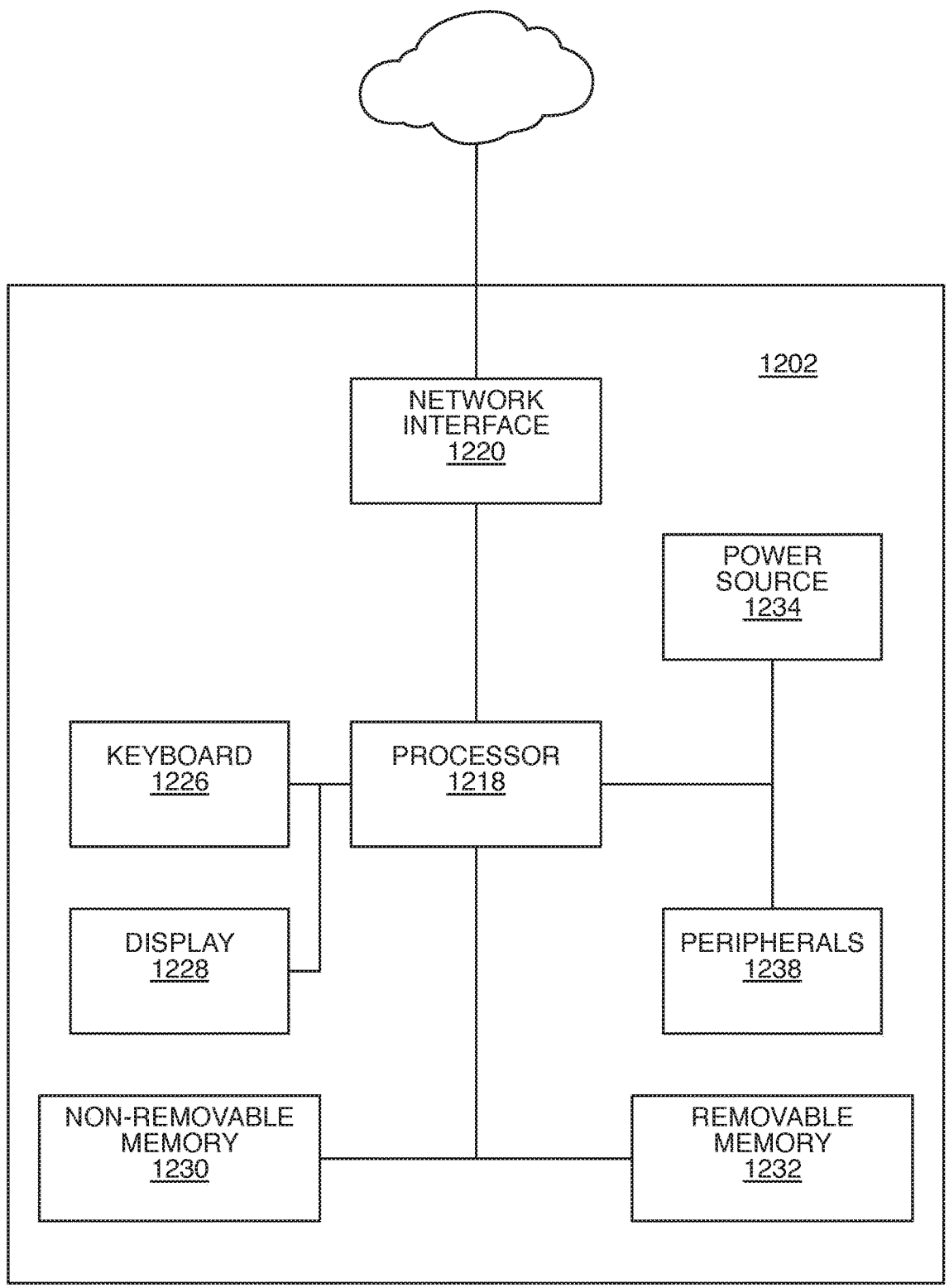
FIG. 12 is a functional block diagram of an exemplary networked computer, in accordance with an embodiment.

In some embodiments, the systems and methods described herein may be implemented in a networked server, such as server 1202 illustrated in FIG. 12. As shown in FIG. 12, the server 1202 may include a processor 1218, a network interface 1220, a keyboard 1226, a display 1228, a non-removable memory 1230, a removable memory 1232, a power source 1234, and other peripherals 1238. It will be appreciated that the server 1202 may include any sub-combination of the foregoing elements while remaining consistent with an embodiment. The server may be in communication with the internet and/or with proprietary networks.

The processor 1218 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1218 may perform signal coding, data processing, power control, input/output processing, and/or any other functionality that enables the server 1202 to operate in a wired or wireless environment. The processor 1218 may be coupled to the network interface 1220. While FIG. 12 depicts the processor 1218 and the network interface 1220 as separate components, it will be appreciated that the processor 1218 and the network interface 1220 may be integrated together in an electronic package or chip.

The processor 1218 of the server 1202 may be coupled to, and may receive user input data from, the keypad 1226, and/or the display 1228 (e.g., a liquid crystal display (LCD) display unit or organic light-emitting diode (OLED) display unit). The processor 1218 may also output user data to the display/touchpad 1228. In addition, the processor 1218 may access information from, and store data in, any type of suitable memory, such as the non-removable memory 1230 and/or the removable memory 1232. The non-removable memory 1230 may include random-access memory (RAM), read-only memory (ROM), a hard disk, or any other type of memory storage device. In other embodiments, the processor 1218 may access information from, and store data in, memory that is not physically located at the server 1202, such as on a separate server (not shown).

The processor 1218 may receive power from the power source 1234, and may be configured to distribute and/or control the power to the other components in the server 1202. The power source 1234 may be any suitable device for powering the server 1202, such as a power supply connectable to a power outlet.

Figure 13:
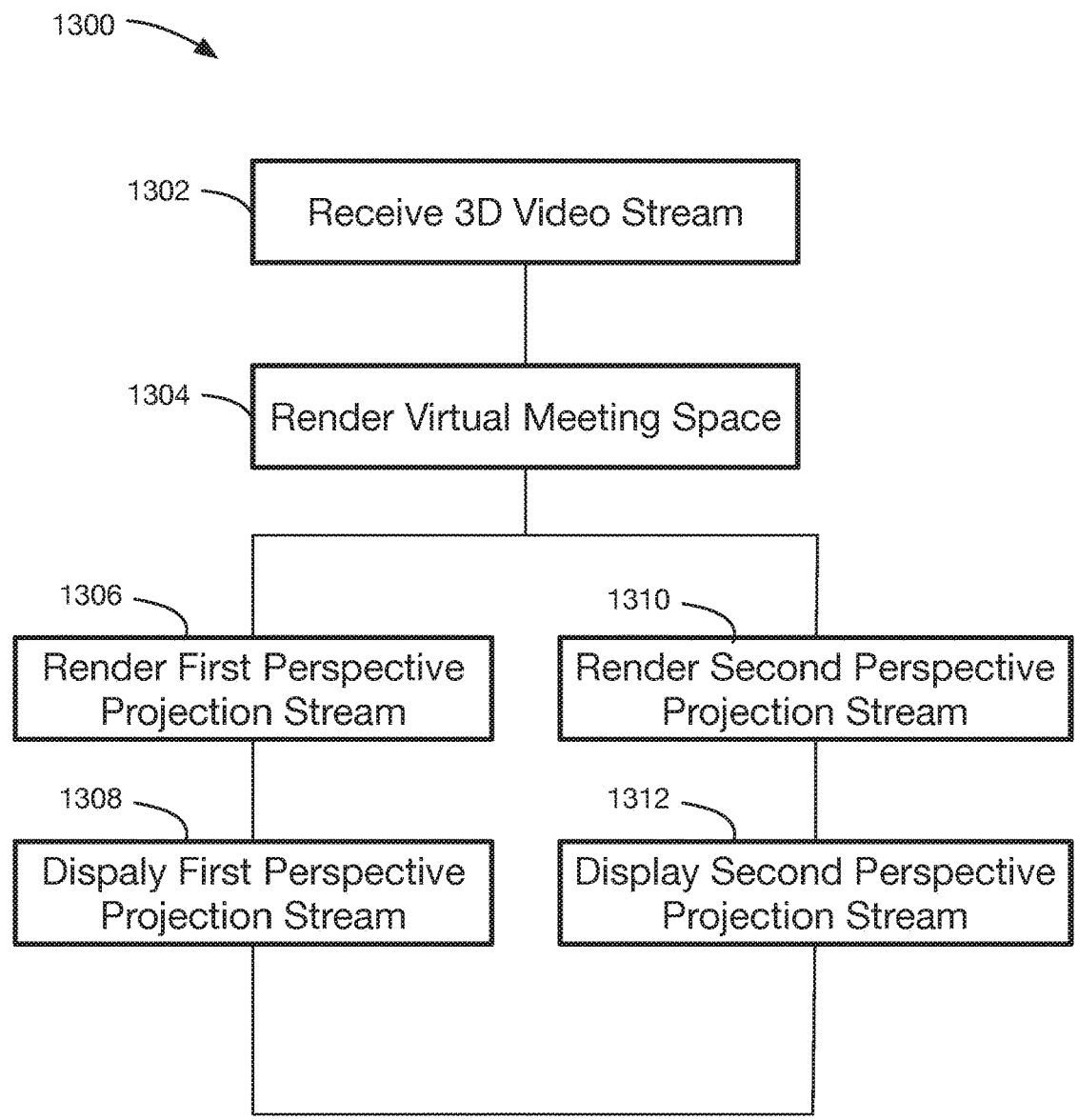
FIG. 13 is a flowchart of a process, in accordance with some embodiments.

FIG. 13 depicts a flowchart of a process 1300, in accordance with some embodiments. A 3D data stream depicting a first participant is received at step 1302. A virtual meeting space having a virtual window is rendered at step 1304. A first perspective projection stream of the received 3D-data stream from a first virtual viewpoint is rendered at step 1306, and displayed in the virtual window at step 1308. A second perspective projection stream of the received 3D-data stream from a second virtual viewpoint is rendered at step 1310, and displayed in the virtual window at step 1312. In some embodiments, the first and second perspective projection streams may be rendered at the same time. In other embodiments, the first and second perspective projection streams may be rendered at different times. In some embodiments, the first and second virtual viewpoints are predetermined viewpoints within the virtual meeting space that can be selected by various participants. In other embodiments, the first and second virtual viewpoints are substantially close to each other, and moving from a first virtual viewpoint to the second virtual viewpoint results in a smooth transition from the first perspective projection stream to the second perspective projection stream.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method comprising:
receiving a first 3D-data stream captured at a first location, the first 3D-data stream comprising 3D visual representations of a first user and a first environment;
rendering a virtual meeting space for a second user, the virtual meeting space comprising 3D synthetic content;
rendering a first representation of the first 3D-data stream based on a viewpoint of the second user, the first representation comprising 3D visual depictions of the first user and the first environment rendered as visible to the second user through a virtual window in the virtual meeting space;
determining a viewpoint change for the second user; and
rendering a second representation of the first 3D-data stream in response to the viewpoint change,
wherein the second representation has a different perspective than the first representation.

2. The method of claim 1, wherein rendering the first representation of the first 3D-data stream comprises rendering the first representation of the first 3D-data stream at a virtual location in the virtual meeting space selected by the first user.

3. The method of claim 1, wherein the virtual location is one of several predetermined virtual locations selectable by the first user.

4. The method of claim 1, further comprising:
rotating the representation of the first 3D data stream in the virtual meeting space based on user input from the first user.

5. The method of claim 1, further comprising:
scaling the first representation of the first 3D-data stream in the virtual meeting space so that the appearance of the first user within the first 3D-data stream is at a similar scale to other users rendered in the virtual meeting space.

6. The method of claim 1, further comprising:
rendering a plurality of 3D-data streams received from a plurality of respective physical locations using separate virtual windows in the virtual meeting space.

7. The method of claim 1, further comprising:
rendering, in the virtual meeting space, a plurality of representations of users at a plurality of respective physical locations,
wherein one or more of the plurality of representations of users are rendered using a 3D-data stream of the respective user and an environment of the respective user captured at the respective physical location, and
wherein rendering one or more of the plurality of representations of users comprises rendering a respective synthetic avatar.

8. The method of claim 1, further comprising:
transitioning, under control of the first user, from a first mode to a second mode,
wherein the first mode comprises rendering the first 3D-data stream in the virtual meeting space, and
wherein the second mode comprises rendering an avatar of the first user in the virtual meeting space.

9. The method of claim 8, wherein transitioning to the second mode enables increased mobility of the first user within the virtual meeting space compared to the first mode.

10. An apparatus comprising:
a processor; and
a non-transitory computer-readable medium storing instructions operative, when executed by the processor, to:
receive a first 3D-data stream captured at a first location, the first 3D-data stream comprising 3D visual representations of a first user and a first environment;
render a virtual meeting space for a second user, the virtual meeting space comprising 3D synthetic content;
render a first representation of the first 3D-data stream based on a viewpoint of the second user, the first representation comprising 3D visual depictions of the first user and the first environment rendered as visible to the second user through a virtual window in the virtual meeting space;

determine a viewpoint change for the second user; and render a second representation of the first 3D-data stream in response to the viewpoint change, wherein the second representation has a different perspective than the first representation.

11. The apparatus of claim 10, wherein the instructions operative, when executed by the processor, to render the first representation of the first 3D-data stream comprise instructions to render the first representation of the first 3D-data stream at a virtual location in the virtual meeting space selected by the first user.

12. The method of claim 1, wherein the first environment is a first real environment that surrounds the first user at the first location.

13. The apparatus of claim 10, wherein the instructions, when executed by the processor, are further operative to:

rotate the representation of the first 3D data stream in the virtual meeting space based on user input from the first user.

14. The apparatus of claim 10, wherein the instructions, when executed by the processor, are further operative to:

scale the first representation of the first 3D-data stream in the virtual meeting space so that the appearance of the first user within the first 3D-data stream is at a similar scale to other users rendered in the virtual meeting space.

15. The apparatus of claim 10, wherein the instructions, when executed by the processor, are further operative to:

render a plurality of 3D-data streams received from a plurality of respective physical locations using separate virtual windows in the virtual meeting space.

16. The apparatus of claim 10, wherein the instructions, when executed by the processor, are further operative to:

render, in the virtual meeting space, a plurality of representations of users at a plurality of respective physical locations, wherein one or more of the plurality of representations of users are rendered using a 3D-data stream of the respective user and an environment of the respective user captured at the respective physical location, and wherein rendering one or more of the plurality of representations of users comprises rendering a respective synthetic avatar.

17. The apparatus of claim 10, wherein the instructions, when executed by the processor, are further operative to:

transition, under control of the first user, from a first mode to a second mode, wherein the first mode comprises rendering the first 3D-data stream in the virtual meeting space, and wherein the second mode comprises rendering an avatar of the first user in the virtual meeting space.

18. The method of claim 1, wherein rendering the second representation of the first 3D-data stream in response to the viewpoint change comprises reconstructing the first 3D-data stream to present the different perspective using depth cues consistent with the viewpoint change.

19. The method of claim 1, wherein the first location is a first real location, wherein the first user is a first real user, wherein the first environment is a first real environment, and wherein the first 3D-data stream comprising 3D visual representations of the first user and the first real environment comprises 3D visual representations of the first real user and the first real environment at the first real location.

20. The method of claim 1, wherein rendering the second representation of the first 3D-data stream in response to the viewpoint change comprises rendering, through the virtual window, the second representation of the first 3D-data stream in response to the viewpoint change.

* * * * *